US010921769B2

(12) United States Patent
Hinderer (10) Patent No.: US 10,921,769 B2
(45) Date of Patent: Feb. 16, 2021

(54) INTERFACE CIRCUIT

(71) Applicant: Infineon Technologies AG, Neubiberg (DE)

(72) Inventor: Thorsten Hinderer, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/536,140

(22) Filed: Aug. 8, 2019

(65) Prior Publication Data
US 2020/0050166 A1 Feb. 13, 2020

(30) Foreign Application Priority Data
Aug. 9, 2018 (DE) .................... 10 2018 119 429.3

(51) Int. Cl.
| | | |
|---|---|---|
| G05B 19/042 | (2006.01) | |
| G06F 13/42 | (2006.01) | |
| G06F 13/40 | (2006.01) | |
| G06F 13/38 | (2006.01) | |
| H04L 25/02 | (2006.01) | |

(52) U.S. Cl.
CPC ....... *G05B 19/0428* (2013.01); *G06F 13/385* (2013.01); *G06F 13/4045* (2013.01); *G06F 13/4282* (2013.01); *H04L 25/0266* (2013.01); *G06F 2213/0042* (2013.01)

(58) Field of Classification Search
CPC ............ H04L 25/0264; H04L 25/0266; H04L 25/0268; H04L 25/0276; H04L 25/028; H04L 25/0292; H04L 25/0298; G05B 19/0428; G06F 13/385; G06F 13/40; G06F 13/4009; G06F 13/4045; G06F 13/4282; G06F 2213/0042

USPC ........ 375/219, 220, 257, 258; 333/117, 119, 333/131, 177, 180
See application file for complete search history.

(56) References Cited

U.S. PATENT DOCUMENTS

| | | | |
|---|---|---|---|
| 8,629,714 B2 | 1/2014 | Ng et al. | |
| 9,673,809 B1 * | 6/2017 | Kandah | H02M 1/32 |
| 10,313,162 B1 * | 6/2019 | Van Den Hoek | H04B 5/0031 |
| | | (Continued) | |

FOREIGN PATENT DOCUMENTS

DE        102010030452 A1    5/2011

OTHER PUBLICATIONS

Application Hints TJA1052i Galvanic Isolated High Speed CAN Transceiver, Rev. 1.2, NXP Semiconductors, Aug. 2014, accessed from https://www.nxp.com/docs/en/supportinginformation/AH1301_Application_Hints_TJA1052i.pdf, 36 pp.

*Primary Examiner* — Young T. Tse
(74) *Attorney, Agent, or Firm* — Shumaker & Sieffert, P.A.

(57) ABSTRACT

The description that follows relates to a circuit having galvanic isolation. According to an exemplary embodiment, the circuit has a transmission circuit, coupled to a galvanically isolating device, that is designed to transmit a first signal via the galvanically isolating device. The circuit further has a first receiver circuit, coupled to the galvanically isolating device, that is designed to receive the transmitted first signal from the galvanically isolating device. A second receiver circuit coupled to the galvanically isolating device is designed to receive the transmitted first signal from the galvanically isolating device and to take the received first signal as a basis for generating a wake-up signal.

13 Claims, 6 Drawing Sheets

(56) References Cited

U.S. PATENT DOCUMENTS

| | | | |
|---|---|---|---|
| 2013/0088264 A1* | 4/2013 | Barrenscheen | H03K 17/162 |
| | | | 327/108 |
| 2014/0341262 A1* | 11/2014 | Allen | H04L 27/08 |
| | | | 375/220 |
| 2015/0054563 A1* | 2/2015 | Flynn | H03K 19/017509 |
| | | | 327/333 |
| 2015/0229149 A1* | 8/2015 | Fahlenkamp | H02J 7/02 |
| | | | 320/114 |
| 2019/0385057 A1* | 12/2019 | Litichever | G06N 3/08 |

* cited by examiner

Fig. 9

INTERFACE CIRCUIT

This Application claims priority to German Application Number 102018119429.3, filed on Aug. 9, 2018, the entire content of which is incorporated herein by reference.

TECHNICAL FIELD

The present description relates to the field of data buses, in particular bus interface circuits having galvanic isolation for serial buses.

BACKGROUND

Data buses are used for digital communication between two or more electronic devices. A device connected to a bus is frequently referred to as a bus node. In general, the expression "bus" usually refers to a communication system comprising both the specification of the bus hardware and a communication protocol according to which the bus nodes communicate with one another. Many data buses are standardized, with different bus standards predominating in different fields of industry. By way of example, in the automotive industry (but also in industrial fields of use), CAN (Controller Area Network), LIN (Local Interchange Network) and FlexRay are frequently used. The cited examples are from the category of field buses.

If there is the intention in a communication system for a data transmission between bus nodes in different supply voltage domains (e.g. 12V/48V in automotive applications), then there is usually provision in the transmission path for galvanic isolation. Galvanic isolation can also be useful for the purposes of overvoltage protection or for other reasons, however, even if different voltage domains having different supply voltages are not used. This galvanic isolation is implemented for example by means of devices such as optocouplers, integrated coreless transformers, coupling capacitors, etc. Such devices can be integrated in bus interface circuits that form an interface between the bus lines and an electronic device such as e.g. a microcontroller. At the same time, the bus interface circuit also forms an interface between two supply voltage domains and ensures the aforementioned galvanic isolation.

In many applications, it is necessary or desirable for the bus interface circuits to be able to be operated in a normal mode of operation and in a mode of operation having low power draw. This mode of operation having low power draw is frequently referred to as "sleep mode" or "power save mode". In this mode of operation having low power draw, the transmission channel via the galvanic isolation is usually not available because circuit components needed for communication are inactive. The term sleep mode is used for the mode of operation having low power draw below.

A bus interface circuit in a sleep mode can be "woken up" by certain events (wake-up events, such as e.g. activity on the bus lines or reception of a wake-up signal, etc.), whereupon the interface circuit changes to the normal mode of operation. Since, as mentioned, the communication via the galvanic isolation is not available in the sleep mode, only that domain in which the wake-up event has occurred can "wake up". The transmission of information about this wake-up event to the other domain via the galvanic isolation is not readily possible on account of the still inactive transmission channel.

SUMMARY

A circuit having galvanic isolation is described below. According to one exemplary embodiment, the circuit has a transmission circuit, coupled to a galvanically isolating device, that is designed to transmit a first signal via the galvanically isolating device. The circuit further has a first receiver circuit, coupled to the galvanically isolating device, that is designed to receive the transmitted first signal from the galvanically isolating device. A second receiver circuit coupled to the galvanically isolating device is designed to receive the transmitted first signal from the galvanically isolating device and to take the received first signal as a basis for generating a wake-up signal.

In addition, a method is described that, according to one exemplary embodiment, comprises the following: detecting a wake-up event in a first domain of an interface circuit having a galvanically isolating device that isolates the first domain from the second domain; transmitting a wake-up request signal via the galvanically isolating device and receiving the wake-up request signal by means of a second reception circuit, arranged in the second domain, while a first reception circuit arranged in the second domain is inactive. A wake-up signal generated by the second reception circuit arranged in the second domain indicates reception of the wake-up request signal.

BRIEF DESCRIPTION OF THE DRAWINGS

Exemplary embodiments are explained more specifically below with reference to figures. The depictions are not necessarily to scale and the exemplary embodiments are not just restricted to the depicted aspects. On the contrary, emphasis is placed on depicting the principles on which the exemplary embodiments are based.

DETAILED DESCRIPTION

The examples described here relate to bus interface circuits for CAN bus systems. It goes without saying that the concepts described here can also be applied in a simple manner to other bus systems such as e.g. LIN, FlexRay or Profibus (Process Field Bus). The description that follows is therefore not restricted to CAN bus systems. In addition, it should be noted that the concepts described here can be applied not only in the automotive sector but also in other industrial applications and in the consumer electronics sector.

Figure 1:
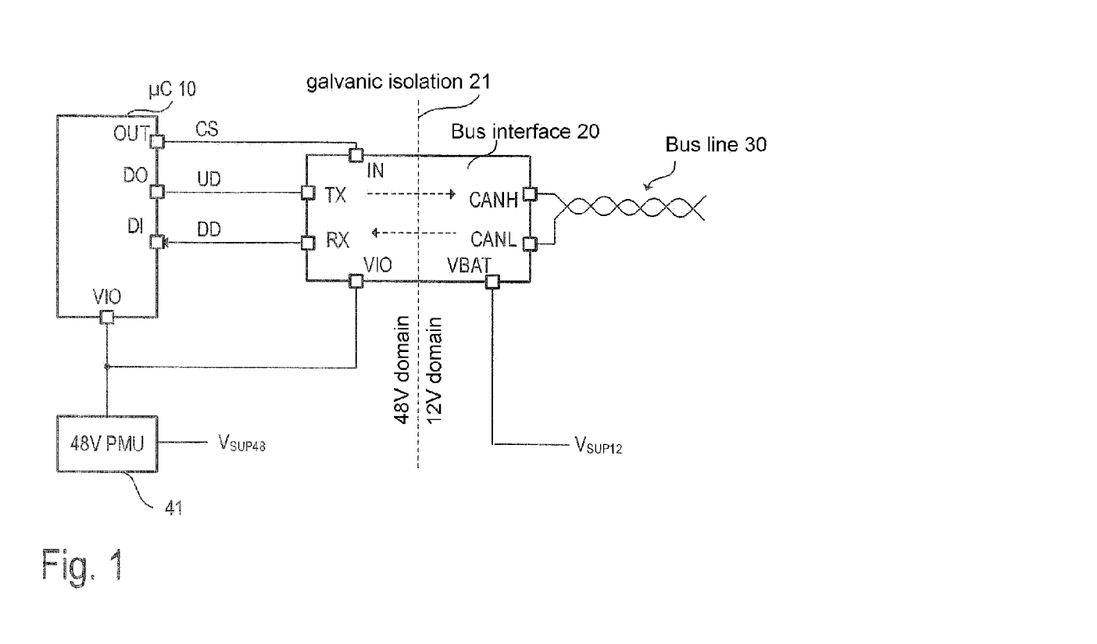
FIG. 1 is a block diagram to illustrate an exemplary application of a bus interface circuit having galvanic isolation.

FIG. 1 illustrates a general example of a bus node having a microcontroller 10 and a bus interface circuit 20 (bus interface for short) for a CAN bus (bus lines 30). It goes without saying that the example is a simplified depiction that contains only those elements that are necessary for the explanations that follow. The microcontroller 10 processes both the data to be transmitted via the bus and the data received from the bus, the data being transmitted as serial data streams that have a format consistent with the bus protocol (e.g. CAN-FD protocol according to ISO 11898-1:2015). In the example depicted, the data stream to be transmitted via the bus is referred to as the uplink data stream UD and the data stream received from the bus is referred to as the downlink data stream DD.

The bus interface 20 contains a galvanic isolation 21, which is sometimes also referred to as a galvanic isolation barrier. The bus interface 20 is designed to use an external contact (e.g. Pin TX) to receive the data stream UD, to transmit this data stream UD via the isolation barrier 21 and to convert it into a corresponding bus signal. In the case of a CAN bus, this bus signal is a differential voltage signal provided on the external chip contacts (e.g. Pins) CANH and CANL. The contacts CANH and CANL are connected to the bus lines 30 (e.g. a twisted pair, Twisted-Pair cable). In the same manner, a data stream received from the bus is transmitted via the isolation barrier 21 and made available to the microcontroller 10 on an external contact (e.g. Pin RX) as a downlink data stream DD. Status and diagnosis information can also be transmitted from one voltage domain to the other voltage domain within the interface circuit via the isolation barrier 21 as a data stream/digital signal (not depicted in FIG. 1).

As mentioned, the bus interface 20 can also be used as an interface between two supply voltage domains. In the example depicted, all components to the right of the isolation barrier 21 are supplied with power via a 12V power supply (supply voltage $V_{SUP12}$) and all components to the left of the isolation barrier 21 are supplied with power via a 48V power supply. In the depiction from FIG. 1, the supply circuit 41 (referred to in FIG. 1 as a PMU, power management unit) converts the supply voltage $V_{SUP48}$ from 48V into a voltage suitable for the microcontroller 10 (e.g. 3.3V). Between the two supply voltage domains, there is no direct electrical (galvanic) connection. Information is transmitted exclusively via the isolation barrier 21. This can have a separate galvanically isolating device (e.g. a coreless transformer) for each data stream to be transmitted (e.g. data streams UD and DD). Further signals and data streams (e.g. the aforementioned status and diagnosis information) can be transmitted together via a galvanically isolating device together with the uplink data stream UD or the downlink data stream DD by means of a type of time-division multiplexing method. The signal CS depicted in FIG. 1, which is output by the microcontroller at the output contact OUT and received by the bus interface circuit 20 at the input contact IN, can be e.g. a binary state signal which the microcontroller 10 can use to address the bus interface circuit 20, for example because a communication with the bus is desired. The detection of a particular logic level of the signal CS while the interface circuit is in a sleep mode can be interpreted e.g. as a wake-up event and can trigger a change of mode to the normal mode of operation. The signal CS depicted in FIG. 1 is only an illustrative example; it is also possible for multiple, different control signals to be output from the microcontroller 10 to the bus interface circuit 20, and reception of any of these control signals can be a wake-up event.

Figure 2:
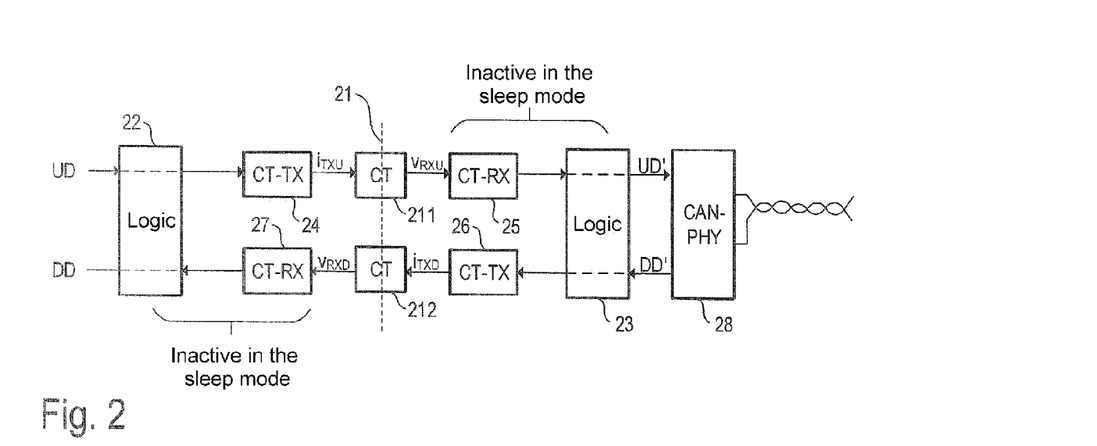
FIG. 2 is a block diagram to illustrate an example of a bus interface circuit having galvanic isolation for communication via a CAN bus.

FIG. 2 illustrates an example of a bus interface circuit 20 on the basis of a simple block diagram. The example in FIG. 2 comprises an uplink signal path and a downlink signal path. In some applications, however, it is also possible for interface circuits having only one signal path to be used, e.g. if a bus node only receives data but does not send any (listen only mode). In the example depicted, the galvanic isolation 21 comprises two coreless transformers 211, 212 (CT) integrated in a chip. In other exemplary embodiments, it is possible for more or fewer coreless transformers to be used. The circuit components depicted in FIG. 2 can be integrated together with the coreless transformers in a chip or in a chip package.

In the uplink signal path of the interface circuit 20, the data stream UD received e.g. from the microcontroller 10 is initially supplied to the logic circuit 22, which, in a normal mode of operation, forwards the data stream substantially to the transmitter circuit 24 (CT-TX). The logic circuit 22 can be e.g. a finite state machine and take on various control functions. By way of example, the logic circuit 22, in the sleep mode, can deactivate various circuit components in the same voltage domain (to the left of the isolation barrier 21 in FIG. 2) in order to reduce the power draw. In the event of a change from the sleep mode to the normal mode of operation or after the interface circuit is switched on, the logic circuit 22 can initialize the transmission channels via the isolation barrier 21. In some exemplary embodiments, the logic circuit 22 can also be designed to use time-division multiplexing to overlay a further signal or a further data stream on the data stream UD.

The transmitter circuit 24 is designed to convert the incoming data stream UD into a signal $i_{TXU}$ (primary current) that can be transmitted via the coreless transformer 211. By way of example, the binary data that the incoming data stream UD contains can be coded as a succession of current pulses that forms the signal $i_{TXU}$. The signal $i_{TXU}$ (i.e. the sequence of current pulses) is supplied to the primary of the coreless transformer 211, as a result of which the signal $v_{RXU}$ is induced in the secondary of the transformer 211, the signal representing the secondary voltage of the transformer 211, which secondary voltage is dependent on the change in the primary current and mutual inductance of the coreless transformer 211. The secondary voltage $v_{RXU}$ is supplied to the receiver circuit 25, which is designed to take the secondary voltage as a basis for reconstructing the data stream UD again. In FIG. 2, the reconstructed data stream is denoted by UD'.

The reconstructed data stream UD' is supplied to the logic circuit 23, which is designed so as, in the normal mode of operation, to forward the data stream UD' to the bus driver circuit 28 forming the physical interface to the bus lines 30. The bus driver circuit 28 is accordingly designed to convert the data stream UD' into a bus signal consistent with the specifications of the bus. In the present example of a CAN bus, the bus signal is a differential voltage $V_{BUS}$ at a recessive low level (consistent with a logic 1) and a dominant high level (consistent with a logic 0). Various specifications of CAN systems are known per se and are therefore not explained further at this juncture. In addition, the bus driver circuit 28 is designed to convert a bus signal received via the bus lines into an e.g. binary data stream. In the example depicted, this downlink data stream is denoted by DD'.

The logic circuit 23 can likewise be a finite state machine and take on various control functions. By way of example, the logic circuit 22, in the sleep mode, can deactivate various circuit components in the same voltage domain (to the right of the isolation barrier 21 in FIG. 2) in order to reduce the power draw. In the event of a change from the sleep mode to the normal mode of operation or after the interface circuit is switched on, the logic circuit 23 can initialize the transmission channels via the isolation barrier 21. Depending on the implementation, the change from the sleep mode to the normal mode of operation can take place directly or indirectly via another mode (e.g. standby mode).

The downlink signal path is of substantially the same design as the uplink signal path. The downlink data stream DD' is supplied to the transmitter circuit 26, which codes the data stream DD' as a succession of current pulses. The associated signal is denoted by $i_{TXD}$ and represents the primary current of the coreless transformer 212. The resulting secondary voltage $v_{RXD}$ of the transformer 212 is supplied to the receiver circuit 27, which takes the secondary voltage $v_{RXD}$ as a basis for reconstructing the downlink data stream DD'. The reconstructed data stream is denoted by DD. This data stream DD' is supplied to the logic circuit 22 and output thereby e.g. at an external chip contact (see FIG. 1, Pin RX) in the normal mode of operation.

At this juncture, it should once again be mentioned that the coreless transformers 211, 212 can be used not only to transmit the data streams UD and DD' but also to exchange information between the logic circuits 22, 23. In particular, status and diagnosis information can be transmitted from one voltage domain to the other voltage domain. As mentioned, the transmitter circuits 24 and 26 and the receiver circuits 25 and 27 are inactive in the sleep mode. In addition, parts of the logic circuits 22 and 23 and parts of the bus driver circuit 28 can be inactive in the sleep mode. When a wake-up event is detected in one voltage domain (e.g. to the right of the isolation barrier 21), the (status) information in this regard cannot be transmitted to the other voltage domain because the receiver circuit in the other voltage domain (e.g. to the left of the isolation barrier 21, receiver circuit 27) is still inactive. Therefore, there is no opportunity to transmit the information relating to the detected wake-up event within the interface circuit via the isolation barrier 21.

In modern bus systems, the data transmission can take place at a comparatively high data rate. By way of example, the CAN-FD (CAN with flexible data rate) permits transmission rates of up to 8 Mbit/s. These data rates require fast transmitter and receiver circuits, which normally need significant quiescent currents and therefore need to be deactivated in a sleep mode in order to keep down the power draw. One way of solving the problem outlined above is not to deactivate the receiver circuits 25 and 27 in the sleep mode, but this would result in a significant power draw and would be contrary to the purpose of the sleep mode.

Figure 3:
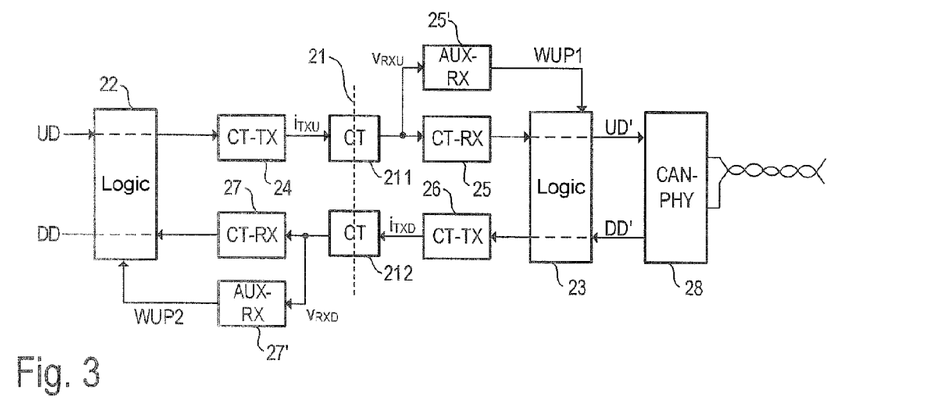
FIG. 3 is a block diagram to illustrate an exemplary embodiment allowing the transmission of information about a wake-up event via the galvanic isolation.

The example shown in FIG. 3 follows a different approach. The block diagram depicted in FIG. 3 is substantially identical to the example from FIG. 2, wherein the uplink signal path and the downlink signal path each have an additional receiver circuit 25' and 27' (AUX-RX), respectively, arranged in them that is coupled to the secondary of the associated coreless transformer 211 or 212. The additional receiver circuits 25' and 27' are discussed primarily below. In regard to the other circuit components, reference is made to the explanations pertaining to FIG. 2. The interface circuit 20 depicted in FIG. 3 can be integrated in a chip or in a chip package, including the coreless transformers 211, 212.

In contrast to the receiver circuits 25 and 27, the additional receiver circuits 25' and 27' are optimized for a low power draw and therefore do not need to be shut down in the sleep mode. As a trade-off for the low power draw, the additional receiver circuits 25' and 27' are comparatively slow, which means that they cannot be used for the "normal" data transmission. However, the additional receiver circuits 25' and 27' can receive a status signal such as e.g. a wake-up request signal from the coreless transformers 211 and 212 even in the sleep mode. The additional receiver circuits 25' and 27' therefore allow the transmission of a wake-up request signal from the first voltage domain to the second voltage domain when a wake-up event is detected e.g. in the first voltage domain. In the case depicted, transmission of a wake-up request in both directions (uplink and downlink directions) is possible. As soon as one of the additional receiver circuits 25' and 27' receives a signal, the wake-up event is signaled to the respective logic circuit 23 or 22 (binary wake-up signals WUP1 and WUP2).

To summarize the process, a wake-up event is detected in one voltage domain. In response to the wake-up event, the respective logic circuit (finite state machine 22 or 23) generates a wake-up request that is transmitted in the form of a wake-up request signal via the galvanically isolating device (coreless transformer 211 or 212). This wake-up request signal is represented on the primary side by the primary current $i_{TXD}$ or $i_{TXU}$, and by the secondary voltage $v_{RXD}$ or $v_{RDU}$ on the secondary side. The relevant information (i.e. the pulse sequence) is the same both in the primary current and in the secondary voltage of a coreless transformer; ultimately, the wake-up request signal is transmitted via the coreless transformer. As soon as the additional receiver circuit in the other voltage domain receives a wake-up request signal, this is indicated by a wake-up signal (denoted by WUP1 or WUP2 in FIG. 3).

The function of the additional receiver circuits 25' and 27' is explained below on the basis of the timing diagrams in FIG. 4. Different circuits suitable for implementing this function are explained later. In the example that follows, it is assumed that a wake-up event has been detected in the 12V voltage domain (cf. FIG. 1), resulting in the logic circuit 23 leaving the sleep mode, as a result of which the transmitter circuit 26 and the receiver circuit 25 are also activated and are ready to send or receive. In order to inform the circuit components in the 48V voltage domain about the change of mode too, the information about the detected wake-up event is transmitted via the isolation barrier 21.

In order to generate a corresponding wake-up signal WUP2 in the 48V voltage domain, the logic circuit 23 generates an input signal (input data stream) for the transmitter circuit 26, so that the latter generates a corresponding succession of current pulses that is supplied to the coreless transformer 212 as primary current $i_{TXD}$. This input data stream can be regarded as a wake-up request signal from the 12V voltage domain to the 48V voltage domain. An example of a succession of current pulses (wake-up request signal) is depicted in the first graph (from the top) of FIG. 4. The resultant secondary voltage $v_{RXD}$ is shown in the second graph of FIG. 4. The secondary voltage $v_{RXD}$ is substantially an AC voltage, the specific signal form not being important. That is to say that in order to transmit a wake-up event, the coreless transformer 212 is actuated such that an AC voltage $v_{RXD}$ is induced on the secondary of said transformer. In one exemplary embodiment, current pulses of the wake-up request signal $i_{TXD}$ have a pulse width of approximately 2.5 ns and a pulse repetition rate of 200 MHz. Other pulse widths and frequencies are possible and they are dependent in practice on the transmission speed in the normal mode of operation and the properties of the transmission channel (the coreless transformer in the examples described here).

The receiver circuit 27 is inactive, but the additional receiver circuit 27' can receive and process the secondary voltage $_{vRXD}$ of the coreless transformer 212. In one exemplary embodiment, the additional receiver circuit 27' is designed to rectify the secondary voltage $_{vRXD}$ and to integrate the rectified voltage $|_{vRXD}|$ (using a defined time constant). The integrated voltage $V_{INT}$ is depicted in the third graph of FIG. 4. In the example depicted in FIG. 4, the inverted voltage—$|_{vRXD}|$ is integrated, so that the integrated voltage $V_{INT}$ becomes smaller, starting from an initial value, as the integration time increases. One specific type of integration considered is peak value rectification. In this case, the signal is integrated until the peak value of the signal is reached (see also FIG. 7-9).

As soon as the integrated voltage $V_{INT}$ reaches or falls below a predetermined threshold value $V_{TH}$ (at the time ti in FIG. 4), this is indicated by the signal $V_{WU}$ (e.g. by a transition from a low level to a high level). An example of this signal $V_{WU}$ is depicted in the fourth graph in FIG. 4. The signal $V_{WU}$ could be used as a wake-up signal, but unintentional waking can be triggered in practice if there is only a very brief fall below the threshold value e.g. on account of interference. In order to increase robustness and prevent unintentional waking, the signal $V_{WU}$ can be filtered such that brief transients are rejected and the wake-up signal WUP2 is not generated at the output of the additional reception circuit 27' until the signal $V_{WU}$ is at a high level for at least a filter time $T_{FILT}$. The wake-up signal WUP2 depicted in the fifth graph of FIG. 4 is received by the logic circuit 22 in the 48V voltage domain, and the logic circuit 22 can prompt a change of mode and likewise leave the sleep mode. The succession of current pulses $i_{TXD}$ (first graph in FIG. 4) can then be terminated, the integrated voltage $V_{INT}$ approaches its initial value again according to the time constant, and the signals $V_{WU}$ and WUP2 are reset to a low level when the voltage $V_{INT}$ exceeds the threshold value $V_{TH}$ again.

Figure 4:
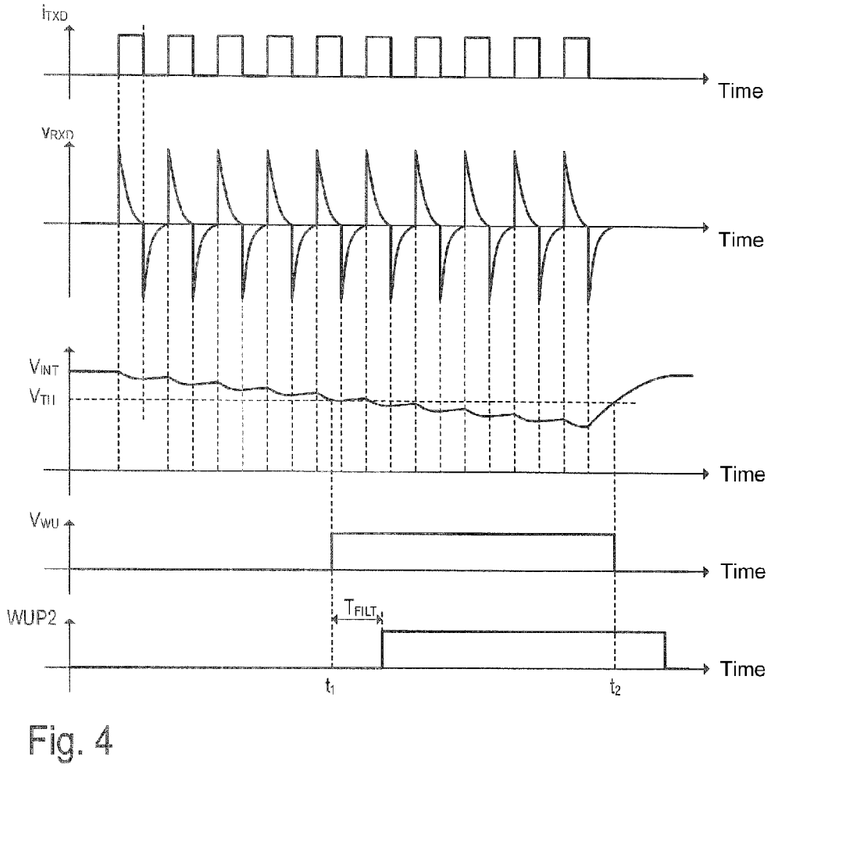
FIG. 4 uses exemplary timing diagrams to illustrate the transmission of information about a wake-up event via the galvanic isolation in the example from FIG. 3.

It goes without saying that the timing diagrams depicted in FIG. 4 are merely exemplary signal waveforms that can also be different in different applications. In particular, high and low levels can be swapped depending on the implementation. The specific signal waveform of the wake-up request signal (e.g. current $i_{TXD}$ in FIG. 4) and of the secondary voltage can differ depending on the specific implementation of the coreless transformers and of the transmitter circuits 24 and 26 of the depicted example. FIG. 4 relates to the transmission of a wake-up event from the 12V voltage domain (on the right in FIG. 3) to the 48V voltage domain (on the left in FIG. 3). The transmission in the other direction by means of the transmitter circuit 24, the transformer 211 and the additional receiver circuit 25' works in the same way. The additional receiver circuits 25' and 27' can be of substantially the same design.

Figure 5:
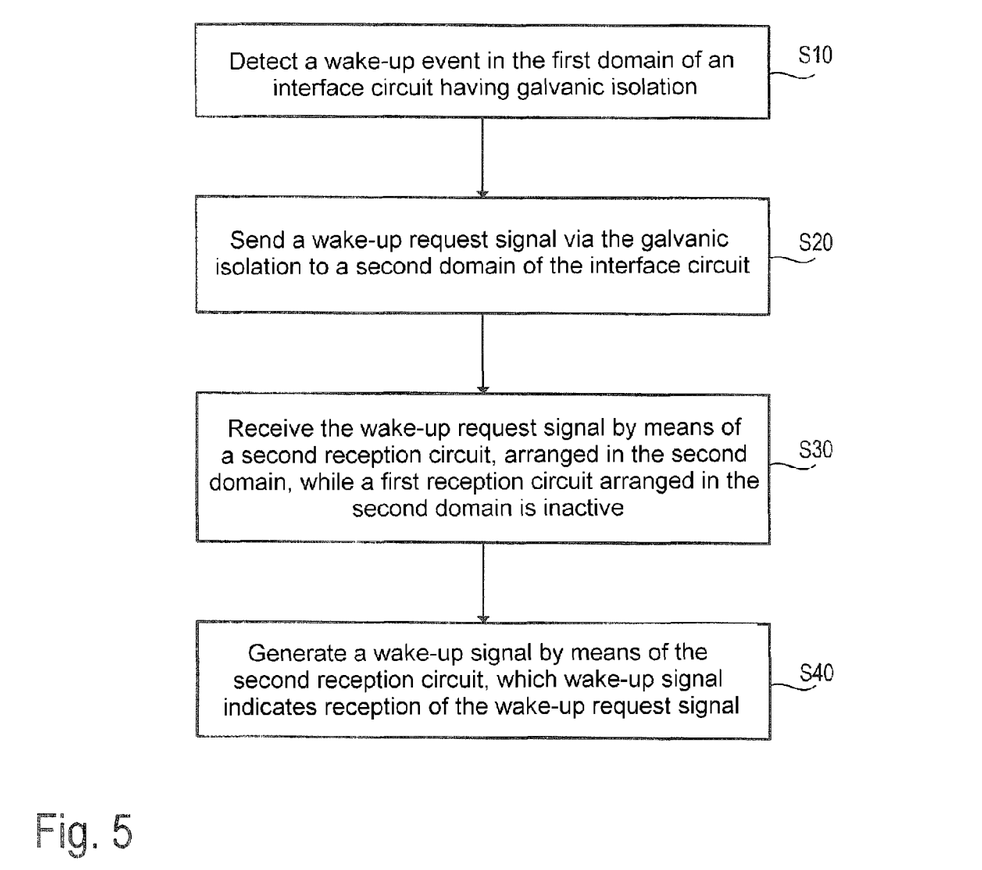
FIG. 5 is a flowchart to depict a first exemplary embodiment of a method for generating a wake-up signal in a voltage domain of an interface circuit having galvanic isolation.

FIG. 5 provides an exemplary illustration of a method for transmitting a wake-up request signal from a first voltage domain (e.g. domain at 48V supply voltage) to a second voltage domain (e.g. domain at 12V supply voltage) of an interface circuit having galvanic isolation of the two voltage domains. According to the example depicted in FIG. 5, the method comprises detecting a wake-up event in the first voltage domain of the interface circuit (see FIG. 5, step S10). In a simple case, the detection of a wake-up event can consist in a chip contact (e.g. pin, solder ball, etc.) being used to receive a signal indicating a change of mode (from the sleep mode to the normal mode of operation). By way of example, in the application from FIG. 1, the microcontroller 10 can generate a signal CS that is supplied to the 48V domain of the interface circuit at the pin IN and can trigger the aforementioned change of mode.

In response to the detection of the wake-up event in the first voltage domain, the logic circuit in the first voltage domain can wake up the circuit components in this voltage domain (among other things the transmitter for the coreless transformer) and transmit a wake-up request signal via the galvanically isolating device to the second voltage domain (see FIG. 5, step S20). In the example from FIG. 3, the detection of a wake-up event in the 48V voltage domain leads to the logic circuit 22 implemented as a finite state machine leaving the sleep mode, as a result of which the transmitter circuit 24 and the receiver circuit 27 are activated. In order to transmit the information in relation to the change of mode to the 12V voltage domain too, the logic circuit 22 prompts the transmitter circuit 24 to generate a wake-up request signal and to transmit it via the coreless transformer 211. This wake-up request signal can be a sequence of current pulses, for example. This sequence is also referred to as a burst signal and, in the example from FIG. 3, is the primary current $i_{TXU}$ of the coreless transformer 211 that is transformed into the secondary voltage $v_{RXU}$. The secondary voltage $v_{RXU}$ has a corresponding succession of pulses (see also FIG. 4).

The method depicted in FIG. 5 moreover comprises receiving the wake-up request signal (e.g. in the form of the secondary voltage vaxu) by means of a second reception circuit 25' arranged in the 12V voltage domain (see FIG. 5, step 30). At this time, the 12V voltage domain does not yet "know" anything of the wake-up event in the 48V voltage domain and is therefore still in the sleep mode, and for this reason the first reception circuit 25 is still inactive. The second reception circuit 25', which, on account of its low power draw, can be active and ready to receive even in the sleep mode, can generate a wake-up signal WUP1 indicating reception of the wake-up request signal (see FIG. 5, step S40), however. The logic circuit 23, which is likewise implemented as a finite state machine, can receive this wake-up signal WUP1 and trigger a change of mode in the 12V voltage domain too. The mechanism described for transmitting the wake-up request signal works in both directions of signal flow (uplink and downlink directions) in the same manner.

Figure 6:
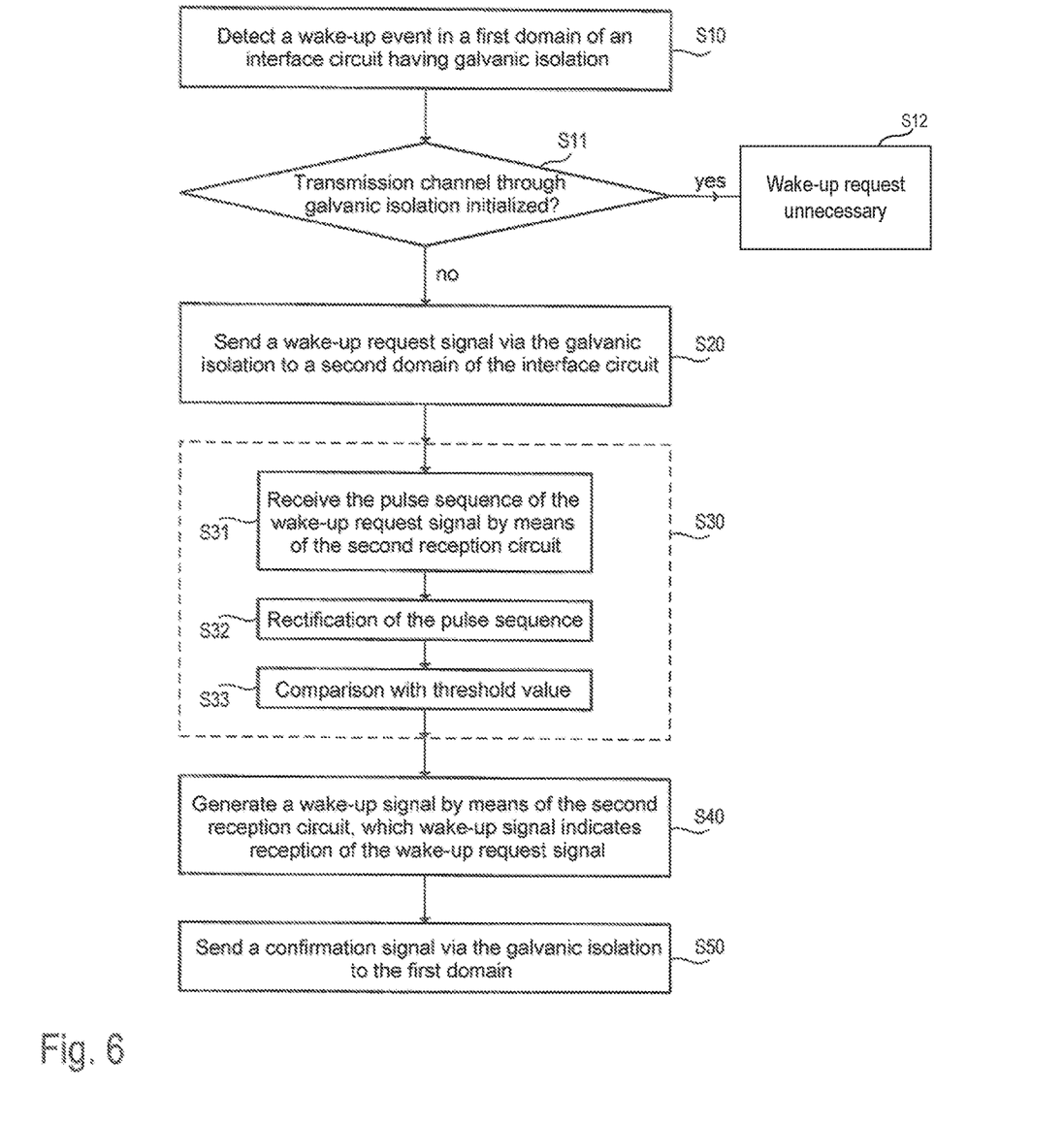
FIG. 6 is a flowchart to depict a second, more detailed exemplary embodiment.

FIG. 6 illustrates a further example of the method described above. The example shown in FIG. 6 is similar to the example shown in FIG. 5, but in the present example the transmitting of a wake-up request signal from one domain to the other domain is preceded by a check being performed to determine whether the other domain is actually in the sleep mode. If the other domain is not or no longer in the sleep mode, transmission of the wake-up request signal is unnecessary. Following the detection of a wake-up event (see FIG. 6, step S10) in the first domain (e.g. 48V voltage domain) that has already been described earlier on, a check is performed to determine whether the second domain (e.g. 12V voltage domain) is (still) in the sleep mode. This check can be achieved simply by virtue of a check being performed to determine whether the transmission channel is already initialized via the galvanic isolation 21 (see FIG. 6, step S11). If this is the case, then the second domain is not or no longer in the sleep mode and the transmitting of a wake-up request is unnecessary (see FIG. 6, step S12). If the transmission channel is not initialized, then a wake-up request signal can be transmitted via the galvanic isolation (see FIG. 6, step S20) as already described above.

In the example described here, the transmission channel is already initialized if data have already been received from the respective other domain. If for example the logic circuit 22 in the 48V domain leaves the sleep mode and data are then immediately received from the 12V domain, then the transmission channel (transmitter circuit 26, coreless transformer 212, receiver circuit 27) is already active and initialized, which can be identified from the content of a state register, for example. If no data are received from the 12V domain, the transmission channel is not initialized, indicating that the 12V domain is still in the sleep mode.

According to the present example, the number of pulses of the pulse sequence forming the wake-up request signal (e.g. primary current irxu) is not fixed, but rather the pulses can be sent until the a confirmation signal is sent from the second domain via the galvanic isolation to the first domain. Accordingly, the pulse sequence of the transmitted wake-up request signal (e.g. secondary voltage vRxu) is received by the second receiver circuit 25' (the first receiver circuit 25 is still inactive at this time) (see FIG. 6, step S31), rectified (see FIG. 6, step S32), and the rectified signal is compared with a threshold value (see FIG. 6, step S33). If the result of the comparison is that the threshold value has been reached, the receiver circuit 25' generates the wake-up signal WUP1 indicating reception of the wake-up request (see FIG. 6, step S40). As already mentioned previously with reference to FIG. 5, the wake-up signal WUP1 prompts the logic circuit 23 to leave the sleep mode, and to activate the transmitter circuit 26 and the receiver circuit 25, allowing "normal" communication (at a comparatively high symbol rate) via the galvanic isolation. The logic circuit 23 can prompt the transmitter circuit 26 to send a confirmation signal via the galvanic isolation 21 (e.g. the coreless transformer 212, cf. FIG. 3) (see FIG. 6, step S40). On receiving the confirmation signal, the logic circuit 22 can stop sending the wake-up request signal (succession of current pulses). Thus, the pulse sequence of the wake-up request signal lasts until the confirmation signal is received confirming that the other domain has woken up.

Figure 7:
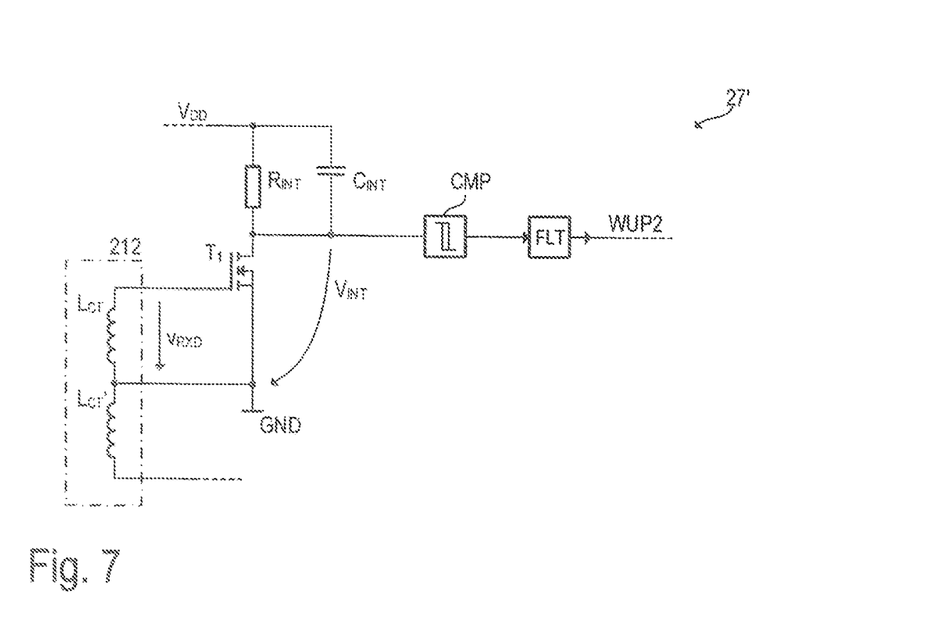
FIG. 7 is a circuit diagram to illustrate a first example of a receiver circuit for receiving a wake-up request signal from a coreless transformer.

FIG. 7 illustrates an exemplary implementation of the additional reception circuit 27' in the downlink signal path. The reception circuit 25' in the uplink signal path can be of substantially the same design. According to the example from FIG. 7, the secondary of the coreless transformer 212 is formed substantially by a (flat) coil having a center tap that is connected to a ground node GND of the associated voltage domain. The center tap allows two partial coils to be considered, which are denoted by $L_{C_r}$ and $L_{CT}$'. In the present example, only the partial coil LCT is considered, in which the secondary voltage $v_{RXD}$ is induced (cf. FIG. 4), said secondary voltage being caused by the wake-up request signal (current $i_{TXD}$) supplied to the primary. The aforementioned rectification takes place in the present case by means of the transistor T1, which also causes amplification of the (rectified) secondary voltage $v_{RXD}$. To this end, the transistor, which is in the form of a MOSFET in the present example, is operated as a common source amplifier. The rectification is thus effected by means of the nonlinear input characteristic of the latter.

According to FIG. 7, the partial coil LCT has one connection connected to the control electrode (gate) of the transistor $T_1$, while the other connection of the partial coil LCT (center tap) is connected to ground. A first load connection (source) of the transistor $T_1$ is likewise connected to ground, while the second load connection (drain) of the transistor $T_1$ is coupled via an impedance $Z_{INT}$ to a supply voltage node at which a supply voltage $V_{DD}$ (referenced to ground) is present. The impedance $Z_{INT}$ is formed in the depicted example by a parallel circuit comprising a resistor $R_{INT}$ and a capacitance $C_{INT}$ ($Z_{INT}=R_{INT}/(1+j\omega R_{INT}C_{INT})$). The voltage $V_{INT}$ provided on the second load connection (drain) of the transistor $T_1$ can be considered an output voltage of the common source amplifier. As a result of the capacitance $C_{INT}$ at the output of the amplifier, the transistor $T_1$ (together with resistor $R_{INT}$ and capacitance $C_{INT}$) acts as a peak value rectifier that integrates the pulses that the secondary voltage VRXD contains until the capacitor voltage is consistent with the peak value of the (possibly amplified) secondary voltage $v_{RDX}$.

The output voltage $V_{INT}$ of the peak value rectifier is supplied to a comparator CMP designed to compare this voltage $V_{INT}$ with a threshold value $V_{TH}$ and to indicate at its output whether the voltage $V_{INT}$ has fallen below the threshold value $V_{TH}$. The output signal $V_{WU}$ of the comparator CMP can be filtered e.g. by means of the filter FLT, in particular in order to reject brief transients in the comparator output signal $V_{WU}$. The filtered signal is referred to as wake-up signal WUP2, which can be supplied to the logic circuit 22 (see FIG. 3). The wake-up signal WUP2 can signal to the logic circuit to leave the sleep mode.

The exemplary implementation shown in FIG. 7 for the reception circuit 25' or 27' is not only comparatively simple (and therefore takes up little chip surface) but also has an extremely small quiescent current that flows when a wake-up request signal is not received via the coreless transformer. Depending on the specific implementation, the quiescent current can be distinctly smaller than 1 µA, which is why the additional receiver circuits 25' and 27' can be active in the sleep mode without significantly increasing the power draw in the sleep mode. The aforementioned quiescent current is determined substantially by the leakage currents flowing through the transistor $T_1$, the comparator and the filter circuit when the transistor $T_1$ is off.

Figure 8:
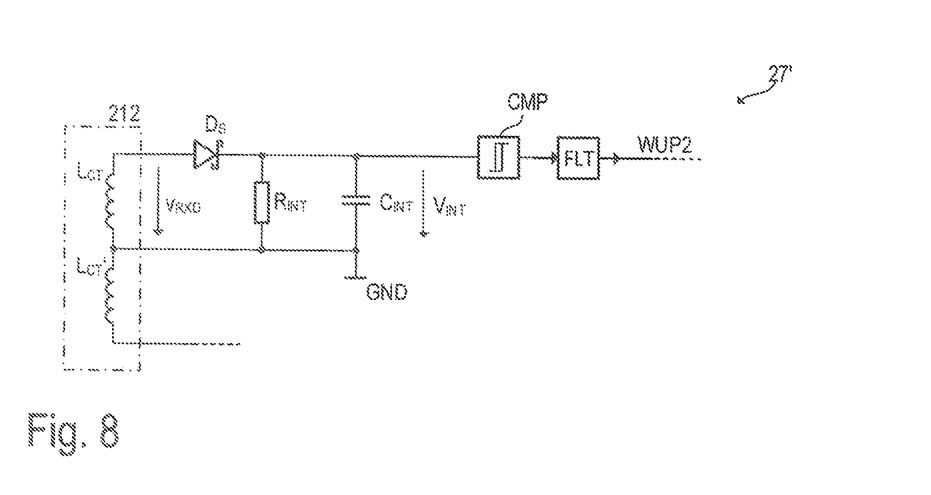
FIG. 8 is a circuit diagram to illustrate a second example of a receiver circuit for receiving a wake-up request signal.

The example from FIG. 8 follows a similar approach to the example from FIG. 7, but instead of a transistor a diode $D_S$ is used in order to implement the peak value rectifier. As in the example from FIG. 7, the connection of the partial coil $L_{CT}$ that forms the center tap of the secondary is connected to a ground node of the associated voltage domain; the other connection of the partial coil $L_{CT}$ is connected to the anode of the diode $D_S$, which is a Schottky diode in the present example. Connected between the cathode of the diode $D_S$ and the ground node GND is an impedance $Z_{INT}$, which can be a parallel circuit comprising resistor $R_{INT}$ and capacitance $C_{INT}$. The output voltage $V_{INT}$ of the peak value rectifier (formed from diode $D_S$, resistor $R_{INT}$ and capacitor $C_{INT}$) is supplied to a comparator CMP designed to compare this voltage $V_{INT}$ with a threshold value $V_{TH}$ and to indicate at its output whether the voltage $V_{INT}$ has exceeded the threshold value $V_{TH}$. The output signal $V_{WU}$ of the comparator CMP can be filtered by means of the filter FLT as in the previous example. In this regard, reference is made to the explanations above.

At this juncture, it should be observed that the common source amplifier used in the example from FIG. 7 has an inverting characteristic, which is why the voltage $V_{INT}$ in the example from FIG. 7, starting from the voltage $V_{DD}$, becomes smaller over time, as shown in the third timing diagram from FIG. 4. By contrast, the peak value rectifier in the example from FIG. 8 does not have an inverting characteristic, which means that the voltage $V_{INT}$ in the example from FIG. 7, starting from a voltage of zero volt, becomes larger over time. Consequently, the comparator CMP in the example from FIG. 7 is an inverting comparator, whereas a noninverting comparator is used in the example from FIG. 8.

Figure 9:
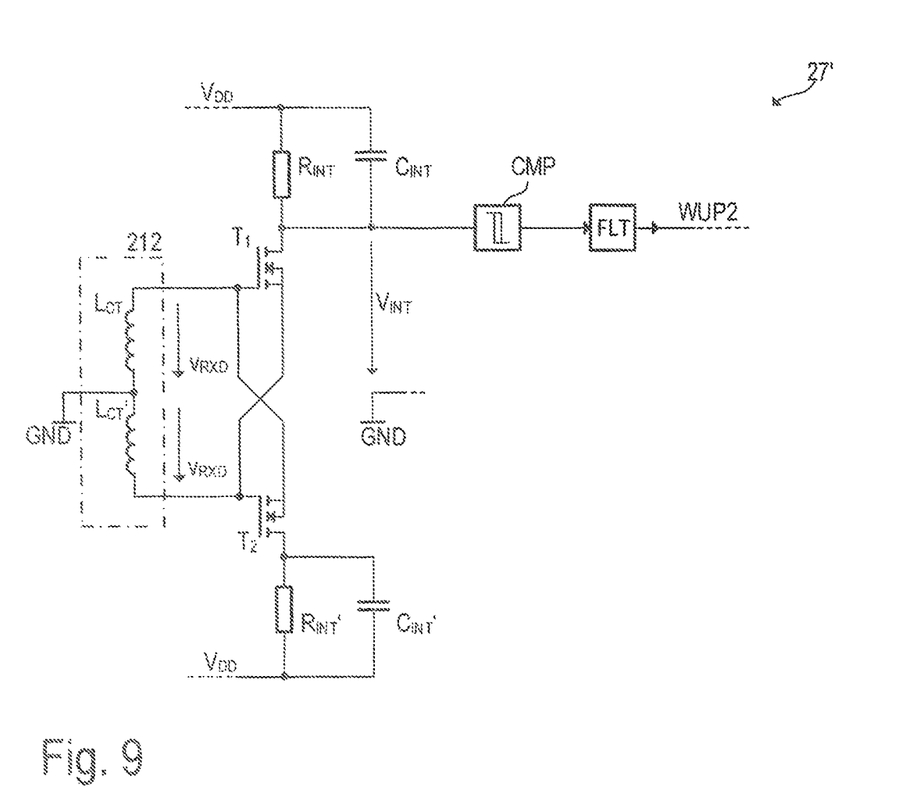
FIG. 9 is a circuit diagram to illustrate a third example of a receiver circuit for a wake-up request signal.

In practical applications, rejection of common mode interference can be desirable or required. In order to improve the common mode rejection (CMR), the circuit from FIG. 7 can be modified. The modified circuit shown in FIG. 9 has an improved CMR. A substantial difference between the example from FIG. 4 and the modified example from FIG. 9 is that the first load connection (source) of the transistor $T_1$ is connected not to the ground node GND (which is also connected to the center tap of the secondary of the transformer 212) but instead to the outer connection of the other partial coil $L_{CT}'$. As the gate/source voltage, the transistor $T_1$ therefore "sees" not the single-ended voltage $v_{RXD}$ across the partial coil $L_{CT}$ but rather the differential voltage between the outer connections of the partial coils $L_{CT}$ and $L_{CT}'$. Common mode interference alters only the voltage on the outer connections relative to the ground node, but not the differential voltage between the outer connections of the partial coils $L_{CT}$ and $L_{CT}'$, which is why the transistor $T_1$ reacts to common mode interference in comparatively insensitive fashion. The way in which the resistor $R_{INT}$, the capacitor $C_{INT}$, the comparator CMP and the filter FLT work are the same as in the example from FIG. 7, and reference is made to the applicable explanations earlier on.

In regard to the balance of the circuit, there is provision for a second transistor $T_2$, the base of which is connected to the outer connection of the partial coil $L_{CT}'$ and the source of which is connected to the outer connection of the partial coil $L_{CT}$. In addition, the drain electrode of the transistor $T_2$ is likewise coupled to the supply voltage node (supply voltage $V_{DD}$) via a parallel circuit comprising resistor $R_{INT}'$ and capacitor $C_{INT}'$. The resistance values of the resistors $R_{INT}'$ and $R_{INT}$ are identical, and the capacitance values of the capacitances $C_{INT}'$ and $C_{INT}$ are also identical, in order to present a balanced load to the coreless transformer.

The invention claimed is:

1. A circuit comprising:
a galvanically isolating device;
a transmission circuit coupled to the galvanically isolating device that is configured to transmit a first signal via the galvanically isolating device;
a first receiver circuit coupled to the galvanically isolating device that is configured to receive the first signal from the galvanically isolating device;
a second receiver circuit coupled to the galvanically isolating device that is configured to receive the first signal from the galvanically isolating device and to take the first signal as a basis for generating a wake-up signal; and
a first logic circuit configured to receive the first signal from the first receiver circuit and the wake-up signal from the second receiver circuit,
wherein the first logic circuit is configured so as in a second mode to deactivate the first receiver circuit and, in response to reception of the wake-up signal, to change from the second mode to a first mode.

2. The circuit according to claim 1, wherein the second mode is a mode of operation with low power draw.

3. The circuit according to claim 1, further comprising:
a bus driver circuit, wherein the first logic circuit is configured forward the first signal to the bus driver circuit and wherein the bus driver circuit is configured to generate a bus signal based on the first signal.

4. The circuit according to claim 3, wherein the first logic circuit is designed so as in the second mode to deactivate at least parts of the bus driver circuit and to activate them again when changing to the first mode.

5. The circuit according to claim 1, further comprising:
a second logic circuit configured so as in response to the detection of a wake-up event to generate a wake-up request signal that is transmitted via the transmission circuit and the galvanically isolation device.

6. The circuit according to claim 5, wherein the second logic circuit is further configured to transmit a data stream via the transmission circuit and the galvanically isolation device, wherein the first data stream is received in the first mode by the first receiver circuit, which is configured to take the first data stream as a basis for reconstructing the data stream.

7. The circuit according to claim 1, wherein the second receiver circuit includes a peak value rectifier having a defined time constant.

8. The circuit according to claim 1, wherein the galvanically isolating device is a coreless transformer.

9. A circuit comprising:
a galvanically isolating device;
a transmission circuit coupled to the galvanically isolating device that is configured to transmit a first signal via the galvanically isolating device;
a first receiver circuit coupled to the galvanically isolating device that is configured to receive the first signal from the galvanically isolating device; and
a second receiver circuit coupled to the galvanically isolating device that is configured to receive the first signal from the galvanically isolating device and to take the first signal as a basis for generating a wake-up signal,
wherein the second receiver circuit includes a rectifying element and an integrator unit coupled to the rectifying element, wherein the rectifying element is configured to rectify the first signal to generate a rectified signal and
wherein the integrator unit is configured to integrate the rectified signal over a period of time that is dependent on a time constant of the integrator unit.

10. A method comprising:
detecting a wake-up event in a first domain of an interface circuit that has a galvanic isolation, wherein the wake-up event isolates the first domain from a second domain;
transmitting a wake-up request signal via the galvanic isolation;
receiving the wake-up request signal by a second reception circuit, arranged in the second domain, while a first reception circuit arranged in the second domain is inactive;
generating a wake-up signal by the second reception circuit arranged in the second domain, wherein the wake-up signal indicates reception of the wake-up request signaL;
triggering a change of mode from a first mode having low power draw to a normal mode of operation; and
transmitting a confirmation signal via the galvanic isolation from the second domain of the interface circuit to the first domain.

11. The method according to claim 10, further comprising:
activating the second reception circuit arranged in the second domain when the wake-up signal indicates reception of the wake-up request signal.

12. The method according to claim 10, wherein the transmission of the wake-up request signal via the galvanic isolation is terminated as soon as the confirmation signal is detected in the first domain.

13. The method according to claim 10, further comprising:
  checking whether a transmission channel via the galvanic isolation is already being initialized, wherein the transmission of the wake-up request signal via the galvanic isolation is started if the transmission channel is not initialized.

\* \* \* \* \*